United States Patent [19]

Bauer et al.

[11] 4,225,492

[45] Sep. 30, 1980

[54] WATER-SOLUBLE DISAZO DYESTUFFS, PREPARED FROM UNSYMMETRICAL HETEROCYCLIC DIAMINES

[75] Inventors: Wolfgang Bauer, Maintal; Joachim Ribka, Offenbach am Main, both of Fed. Rep. of Germany

[73] Assignee: Cassella Aktiengesellschaft, Frankfurt, Fed. Rep. of Germany

[21] Appl. No.: 867,025

[22] Filed: Jan. 5, 1978

[30] Foreign Application Priority Data

Jan. 11, 1977 [DE] Fed. Rep. of Germany ....... 2700805

[51] Int. Cl.[3] ............ C09B 35/34

[52] U.S. Cl. ............ 260/157; 260/156; 260/158; 260/160; 8/662

[58] Field of Search ............ 260/157, 158, 160

[56] References Cited

U.S. PATENT DOCUMENTS

| | | | |
|---|---|---|---|
| 4,024,125 | 5/1977 | Kunstmann et al. | 260/158 X |
| 4,033,945 | 7/1977 | Bauer et al. | 260/158 X |

*Primary Examiner*—Helen M. S. Sneed

*Attorney, Agent, or Firm*—Connolly and Hutz

[57] ABSTRACT

Water-soluble disazo dyestuffs having the general formula $B_1—N=N—Z—N=N—B_2$ wherein Z is

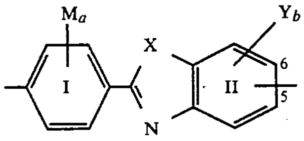

or -continued

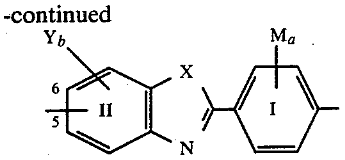

wherein Y and M are the same or different and are methyl, ethyl, methoxy, ethoxy, and halogen, a and b are 0, 1 or 2, X is

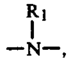

—O— or —S—, $R_1$ is hydrogen, alkyl having one to 4 carbon atoms, phenyl or benzyl, $B_1$ is a CH-acid coupling component of the acetoacetic acid arylamide series of the formula

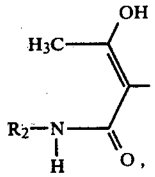

wherein $R_2$ is phenyl, substituted phenyl, naphthyl-1, benzimidazolon-5-yl, substituted benzimidazolon-5-yl, or substituted napthyl-1, naphthyl-2, or substituted naphthyl-2, and $B_2$ denotes a second coupling component radical wherein $B_1$ and $B_2$ are identical or different with the proviso that said disazo compound contains at least one sulpho group or carboxyl group in the dyestuff molecule.

12 Claims, No Drawings

WATER-SOLUBLE DISAZO DYESTUFFS, PREPARED FROM UNSYMMETRICAL HETEROCYCLIC DIAMINES

The present invention relates to water-soluble disazo dyestuffs of the general formula (I)

$B_1—N=N—Z—N=N—B_2$ (I)

wherein Z is

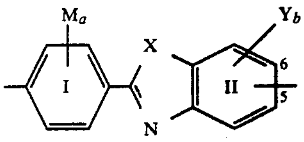

or

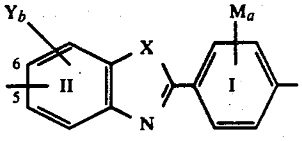

wherein Y and M are the same or different and are methyl, ethyl, methoxy, ethoxy, and halogen, a and b are 0, 1 or 2, X is

—O— or —S—, $R_1$ is hydrogen, alkyl having one to 4 carbon atoms, phenyl or benzyl, $B_1$ is a CH-acid coupling component of the acetoacetic acid arylamide series of the formula II

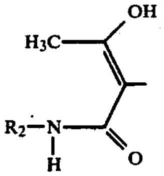

(II)

6-hydroxy-2-pyridone of the formula III

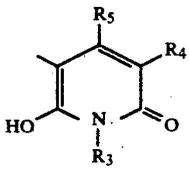

(III)

wherein $R_2$ is phenyl, substituted phenyl, naphthyl-1, benzimidazolon-5-yl, substituted benzimidazolon-5-yl, or substituted naphthyl-1, naphthyl-2, or substituted naphthyl-2, wherein $R_3$ is hydrogen, alkyl having 1 to 4 carbon atoms or phenyl, $R_4$ denotes hydrogen, -C≡N, $—CO_2H$, $—CONH_2$ or $—SO_3H$, and $R_5$ is hydrogen or alkyl having 1 to 4 carbon atoms, and $B_2$ denotes a second coupling component radical wherein $B_1$ and $B_2$ are identical or different with the proviso that said disazo compound contains at least one sulpho group or carboxyl group in the dyestuff molecule, the sulpho group or carboxyl group can also be in the form of the alkali metal salt, alkaline earth metal salt or ammonium salt.

$B_2$ can be the radical or any known azo coupling component; i.e., the particular coupling component radical chosen for $B_2$ is not critical.

$B_1$ may be the radical of a CH-acid coupling component of the acetoacetic acid arylamide series of the formula II

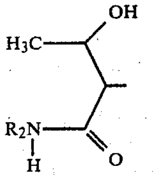

(II)

wherein $R_2$ is phenyl,

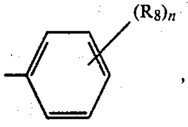

, naphthyl-1, naphthyl-2,

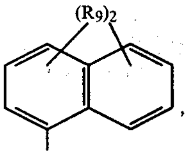

,

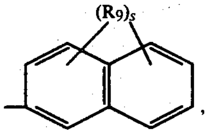

, benzimidazolon-5-yl, halogen substituted benzimidazolon-5-yl or alkyl-substituted benzimidazolon-5-yl having 1 to 2 carbon atoms in the alkyl moiety, wherein $R_8$ is sulpho, carboxyl, nitro, amino, cyano, halogen, alkyl having 1 to 4 carbon atoms, hydroxyl, alkoxy having 1 to 4 carbon atoms or alkanoylamino having 1 to 4 carbon atoms in the alkanoyl moiety, $R_9$ is sulpho, and n and s are 1, 2 or 3.

$B_2$ may be the same or different as $B_1$ and $B_2$ may be the radical of a coupling component of the benzene, naphthalene, acetoacetic acid arylamide, 5-pyrazolone, 6-hydroxy-2-pyridone or 2,6-diaminopyridine series. If $B_2$ represents a radical of the benzene series it may be a phenyl having at least one substituent selected from the group consisting of alkyl having 1 to 6, preferably 1 to 4, carbon atoms, alkoxy having 1 to 4 carbon atoms, benzenesulphonyloxy, p-toluenesulphonyloxy, hydroxy, cyano, nitro, sulpho, carboxyl, halogen such as chlorine or bromine, alkoxycarbonyl with 1 to 4 carbon atoms, in the alkoxy moiety, amino, amino mono- or disubstituted with alkyl having 1 to 4 carbon atoms, carboxyalkyl, sulphoalkyl or hydroxyalkyl each having 1 or 2 carbon atoms in the alkyl moiety, or amino monosubstituted with phenyl, tolyl, oxalyl, alkylcarbonyl having 1 to 4 carbon atoms or benzoyl.

$B_2$ may also be a radical derived from a coupling component of the 1-aminonaphthalene, 2-aminonaphthalene, 1-hydroxynaphthalene or 2-hydroxynaphthalene series. Also the aminonaphthalenes or hydroxynaphthalenes may have a carboxyl substituent or 1–3 sulpho substituents. The amino groups of the aminonaphthalenes may also be monosubstituted with alkanoyl having 1 to 4 carbon atoms in the alkanoyl moiety, benzoyl, phenyl, tolyl, alkyl having 1 to 4 carbon atoms or carboxyalkyl, hydroxyalkyl or sulphoalkyl, each having 1 to 2 carbon atoms.

$B_2$ may also be a radical of a coupling component of the 5-pyrazolone series of the formula IV (IV)

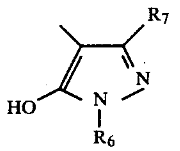

wherein $R_6$ denotes hydrogen, alkyl with 1–4 C atoms or a phenyl radical which is optionally monosubstituted, disubstituted or trisubstituted with sulpho, carboxyl, nitro, amino, cyano, halogen, such as chlorine or bromine, alkyl with 1–4 C atoms or alkoxy with 1–4 C atoms, or a naphthyl-1 or naphthyl-2 radical which is optionally monosubstituted or disubstituted with sulpho and $R_7$ denotes hydrogen, alkyl with 1–4 C atoms, carboxyl, alkoxycarbonyl with 1–4 C atoms in the alkoxy radical, aminocarbonyl or acetyl. Preferred radicals $R_6$ are hydrogen, phenyl or a phenyl radical which is monosubstituted, disubstituted or trisubstituted with sulpho, carboxyl, chlorine, nitro, amino, alkyl with 1-2 C atoms or alkoxy with 1-2 C atoms. $R_7$ preferably represents methyl, carboxyl, methoxycarbonyl or ethoxycarbonyl.

$B_2$ may also be derived from the radical of a coupling component of the 6-hydroxy-2-pyridone series of the formula III (III)

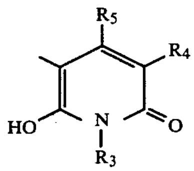

wherein $R_3$ denotes hydrogen, alkyl with 1–4 C atoms or phenyl, $R_4$ denotes hydrogen, —C≡N, —$CO_2H$, —$CONH_2$ or —$SO_3H$ and $R_5$ denotes hydrogen or alkyl with 1–4 C atoms. Preferably, $R_3$ represents hydrogen, alkyl with 1-2 C atoms or phenyl, $R_4$ represents H, —C≡N or —$SO_3H$ and $R_5$ represents hydrogen or alkyl with 1-2 C atoms.

$B_2$ can also be a 2,6-diamino-5-pyridyl radical.

The water-soluble disazo dyestuffs according to the invention are outstandingly suitable for use as direct dyestuffs for dyeing and printing natural or synthetic fibre materials which contain hydroxyl groups and which contain nitrogen.

In the dyestuffs according to the invention, those radicals $B_1$ which are derived from CH-acid coupling components of the acetoacetic acid arylamide series of the formula II (II)

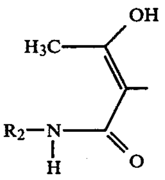

wherein $R_2$ represents a phenyl radical which is optionally monosubstituted, disubstituted or trisubstituted with sulpho, carboxyl, hydroxyl, nitro, amino, cyano, halogen, such as chlorine, or bromine, alkyl with 1–4 C atoms, alkoxy with 1–4 C atoms or alkanoylamino with 1–4 C atoms in the alkanoyl radical, or a naphthyl-1 or naphthyl-2 radical which is optionally monosubstituted, disubstituted or trisubstituted with sulpho, or a benzimidazolon-5-yl radical which is optionally monosubstituted with halogen, such as chlorine or bromine, or alkyl with 1–2 C atoms, are preferred.

A further group of preferred radicals $B_1$ is derived from CH-acid coupling components of the 6-hydroxy-2-pyridone series of the formula III (III)

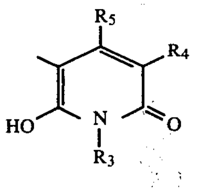

wherein $R_3$ denotes hydrogen, alkyl with 1-2 C atoms or phenyl, $R_4$ denotes hydrogen, —C≡N or —$SO_3H$ and $R_5$ denotes hydrogen or alkyl with 1-2 C atoms.

In a preferred group of disazo dyestuffs, according to the invention, $B_2$ represents a phenyl radical which is monosubstituted or disubstituted with amino and/or hydroxyl, it being possible for the amino groups also to be monosubstituted or disubstituted with alkyl radicals with 1-4 C atoms or carboxyalkyl, sulphoalkyl or hydroxyalkyl radicals with 1-2 C atoms, or monosubstituted by phenyl, o-tolyl, oxalyl, alkylcarbonyl with 1-4 C atoms or benzoyl.

A further group of preferred radicals $B_2$ is derived from coupling components of the acetoacetic acid arylamide series of the formula II (II)

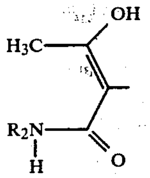

wherein $R_2$ denotes phenyl which is optionally monosubstituted, disubstituted or trisubstituted with sulpho, carboxyl, nitro, amino, cyano, halogen, such as chlorine or bromine, alkyl with 1-4 C atoms, hydroxyl, alkoxy with 1-4 C atoms or alkanoylamino with 1-4 C atoms in the alkanoyl radical, or naphthyl-1 or naphthyl-2 which is optionally monosubstituted, disubstituted or trisubstituted with sulpho, or benzimidazolon-5-yl which is optionally monosubstituted by halogen, such as chlorine or bromine, or alkyl with 1-2 C atoms.

The divalent radical Z contained as the middle component in the dyestuffs, according to the invention, can be bonded, via the azo bridge, to the radical of the coupling component $B_1$ either by the non-fused phenyl nucleus (nucleus I) or by the fused phenyl nucleus (nucleus 2).

In the sense of the present invention, mixtures of dyestuffs which are isomeric with one another in respect of the incorporation of the heterocyclic middle component Z are accordingly also to be understood as dyestuffs according to the invention.

The azo bridge bonded to the nucleus II of the benzimidazole, benzoxazole or benzthiazole system of Z can be in the 5-position or 6-position, which is expressed in the general formula by the valence bond between the 5-position and 6-position.

Those dyestuffs in which the nuclei I and/or II of the heterocyclic radical Z are unsubstituted or monosubstituted with a methyl group or chlorine are preferred.

Dyestuffs in which the heterocyclic middle component Z is a divalent radical of 2-phenylbenzimidazole are particularly preferred.

The water-soluble disazo dyestuffs according to the invention of the formula I $$B_1—N{=}N—Z—N{=}N—B_2 \quad (I)$$

wherein $B_1$, Z and $B_2$ have the abovementioned meaning, are manufactured by a process in which diazotised monoazo dyestuffs of the formula V $$Y^{\ominus}\left[\overset{\oplus}{N}{=}N—Z—N{=}N—B_2\right] \quad (V)$$

wherein $Y^{\ominus}$=the anion of a mineral acid, such as hydrochloric acid or sulphuric acid, and Z and $B_2$ have the abovementioned meaning, are coupled, at a pH value of 3–10, preferably 7–9.5, and at temperatures from −10° to +80° C., preferably 0° to +50° C., with coupling components of the formula $B_1$-H (VI), $B_1$-H being a CH-acid coupling component of the acetoacetic acid arylamide series of the formula VIa.

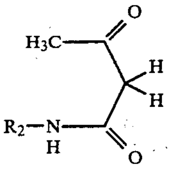

(VIa)

or of the 6-hydroxy-2-pyridone series of the formula VIb

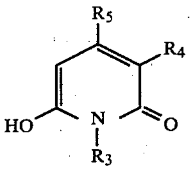

(VIb)

and $R_2$, $R_3$, $R_4$ and $R_5$ having the abovementioned meaning.

The water-soluble disazo dyestuffs, according to the invention, of the formula I $$B_1—N{=}N—Z—N{=}N—B_2 \quad (I)$$

can furthermore also be manufactured by a process in which diazotised monoazo dyestuffs of the formula VII $$B_1—N{=}N—Z—N{=}\overset{\oplus}{N}\Big]\,y^{\ominus} \quad (VII)$$

wherein $y^{\ominus}$=the anion of a mineral acid, such as hydrochloric acid or sulphuric acid, $B_1$ =

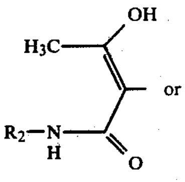

(II)

or

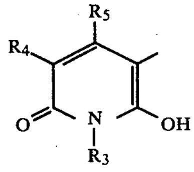

(III)

and Z, $R_2$, $R_3$, $R_4$ and $R_5$ have the meaning already given, are coupled, at a pH value of 3–10, preferably of 7–9.5, and at temperatures from −10° to +80° C., preferably 0° to +50° C., with coupling components of the formula VIII $$B_2\text{-H} \quad (VIII)$$

wherein $B_2$ has the meaning described above.

Dyestuffs, according to the invention, of the formula I in which $B_1$ and $B_2$ are identical and are radicals of a CH-acid coupling component of the acetoactic acid arylamide series of the formula II

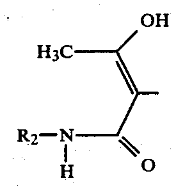

(II)

wherein $R_2$ has the abovementioned meanings, or of the 6-hydroxy-2-pyridone series of the formula III

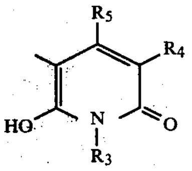

(III)

wherein $R_3$, $R_4$ and $R_5$ have the abovementioned meanings, can also be manufactured by a particular embodiment of the above manufacturing process, in which a tetrazo compound of a heterocyclic diamine of the formula IX

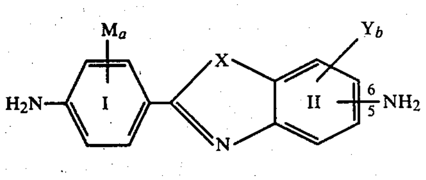

(IX)

wherein X, M, Y, a and b have the abovementioned meaning, is coupled, at pH values of 2–12, preferably of 3–10, and at temperatures from −10° to +80° C., preferably from 0° to +50° C., with two mols of a CH-acid coupling component of the acetoacetic acid arylamide series of the formula VIa

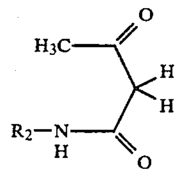

(VIa)

or of the 6-hydroxy-2-pyridone series of the formula VIb

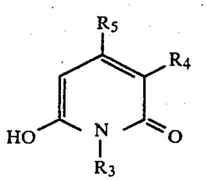

(VIb)

wherein $R_2$, $R_3$, $R_4$ and $R_5$ have the abovementioned meaning.

The diazotised monoazo dyestuffs of the formula V $$y^{\ominus}\left[\overset{\oplus}{N}{=}N{-}Z{-}N{=}N{-}B_2\right] \quad (V)$$

required for the manufacture of the disazo dyestuffs I according to the invention $$B_1{-}N{=}N{-}Z{-}N{=}N{-}B_2 \quad (I)$$

can be manufactured by a process in which heterocyclic diamines of the formula IX

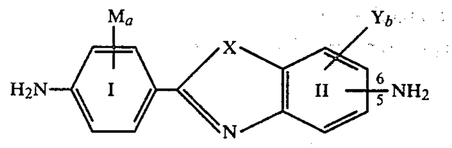

(IX)

wherein X, M, Y, a and b have the abovementioned meaning, are tetrazotised and first coupled on one side, at pH values of 2–12, preferably 3–10, and at temperatures from −10° to +80° C., preferably 0° to +50° C., with coupling components of the formula $$B_2\text{-}H \quad (VIII)$$

The diazotised monoazo dyestuffs of the formula VII $$B_1{-}N{=}N{-}Z{-}N{=}\overset{\oplus}{N}\left.\right]y^{\ominus} \quad (VII)$$

wherein $B_1$ =

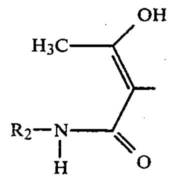

or

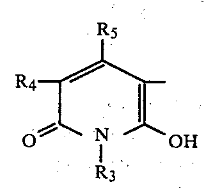

(II) (III)

and Z, $y^{\ominus}$, $R_2$, $R_3$, $R_4$ and $R_5$ have the meaning already given, required for the manufacture of the disazo dyestuffs according to the invention are manufactured by a process in which heterocyclic diamines of the formula IX

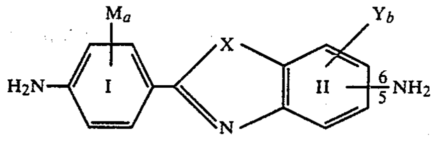

(IX)

are first tetrazotised and then coupled on one side, at pH values of 2–12, preferably 3 to 7.5, and at temperatures from −10° to +80° C., preferably 0° to +50° C., with coupling components of the formula VIa or VIb.

The tetrazotisation of the heterocyclic diamines of the formula IX and the abovementioned coupling reactions with the coupling components $B_1$-H (VIa, VIb) and/or $B_2$-H (VIII) are preferably carried out in an aqueous medium. Water-miscible organic solvents, for example alcohols, such as methanol, ethanol, n-propanol and isopropanol, and coupling accelerators which are in themselves known, for example urea, thiourea or pyridine, can optionally be present in the aqueous medium.

Heterocyclic diamines of the formula IX

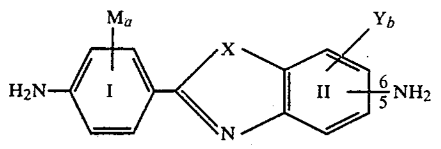

(IX)

wherein X, M, Y, a and b have the abovementioned meaning, which are suitable for the manufacture of the water-soluble disazo dyestuffs of the formula I are, for example: 2-(4'-aminophenyl)-5 (or-6)-aminobenzimidazole, 1-methyl-2-(4'-aminophenyl)-6-amino-benzimidazole, 1-methyl-2-(4'-aminophenyl)-5-amino-benzimidazole, 1-ethyl-2-(4'-aminophenyl)-5-amino-benzimidazole, 1-propyl-2-(4'-aminophenyl)-5-aminobenzimidazole, 1-butyl-2-(4'-aminophenyl)-5-amino-benzimidazole, 1-phenyl-2-(4'-aminophenyl)-5-amino-benzimidazole, 1-benzyl-2-(4'-aminophenyl)-5-amino-benzimidazole, 2-(4'-aminophenyl)-4-methyl-5-amino-benzimidazole (identical to 2-(4'-aminophenyl)-6-amino-7-methyl-benzimidazole), 2-(4'-aminophenyl)-5-amino-6-methyl-benzimidazole (identical to 2-(4'-aminophenyl)-5-methyl-6-amino-benzimidazole), 2-(4'-aminophenyl)-5-amino-6-chloro-benzimidazole (identical to 2-(4'-aminophenyl)-5-chloro-6-amino-benzimidazole), 2-(4'-aminophenyl)-5-amino-7-chloro-benzimidazole (identical to 2-(4'-aminophenyl)-4-chloro-6-amino-benzimidazole), 2-(4'-aminophenyl)-5-amino-6-ethoxy-benzimidazole (identical to 2-(4'-aminophenyl)-5-ethoxy-6-amino-benzimidazole), 2-(2'-methyl-4'-aminophenyl)-5 (or-6)-amino-benzimidazole, 2-(3'-methyl-4'-aminophenyl)-5 (or-6)-amino-benzimidazole, 2-(2'-chloro-4'-aminophenyl)-5 (or-6)-amino-benzimidazole, 2-(3'-chloro-4'-aminophenyl)-5 (or-6)-amino-benzimidazole, 2-(4'-aminophenyl)-5-amino-benzoxazole, 2-(4'-aminophenyl)-6-amino-benzoxazole, 2-(4'-amino-2'-chlorophenyl)-5-amino-benzoxazole, 2-(4'-aminophenyl)-4-methyl-5-amino-benzoxazole, 2-(4'-aminophenyl)-5-amino-benzthiazole, 2-(4'-aminophenyl)-6-amino-benzthiazole, 2-(4'-aminophenyl)-6-methyl-5-amino-benzthiazole, 2-(4'-aminophenyl)-5-methyl-6-amino-benzthiazole and 2-(4'-aminophenyl)-5-chloro-6-aminobenzthiazole.

Tautomerism is possible in the benzimidazoles where X=NH, so that, for example, no distinction can be made between the 5-position and 6-position. If further substituents are also present in the nucleus II, there are two different numbering possibilities, which has been taken into consideration above. Furthermore, all those heterocyclic diamines of the formula IX which can be obtained according to the manufacturing methods indicated in German Auslegesschrift No. 2,424,462, page 13 to 19, are also suitable for the manufacture of the disazo dyestuffs according to the invention.

The heterocyclic diamines IX have an unsymmetric structure. Two possibilities occur in the coupling of a tetrazotised heterocyclic diamine IX with a coupling component $B_1$-H (VI) or $B_2$-H (VIII), depending which side of the tetrazotised amine couples first. In accordance with these two possibilities, the structures Ia and Ib

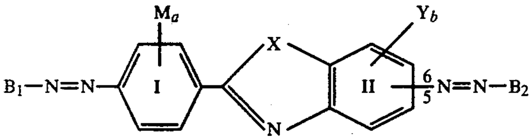

(Ia)

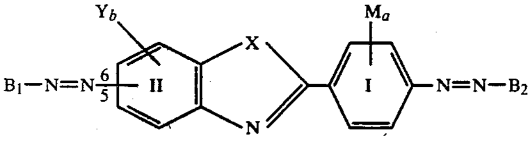

(Ib)

are given for the end dyestuffs I.

It can be assumed that the disazo dyestuffs of the general formula I which can be manufactured in the manner given are mixtures of the two isomers Ia and Ib.

Suitable coupling components of the formula $B_1$-H (VI) of the acetoacetic acid arylamide series (VIa) are, for example: acetoacetic acid anilide, acetoacetic acid 2-methylanilide, acetoacetic acid 3-methylanilide, acetoacetic acid 4-methylanilide, acetoacetic acid 2-ethylanilide, acetoacetic acid 3-ethylanilide, acetoacetic acid 4-ethylanilide, acetoacetic acid 2,4-dimethylanilide, acetoacetic acid 2,5-dimethylanilide, acetoacetic acid 2-chloroanilide, acetoacetic acid 3-chloroanilide, acetoacetic acid 4-chloroanilide, acetoacetic acid 2-methyl-3-chloroanilide, acetoacetic acid 2-methyl-4-chloroanilide, acetoacetic acid 2,4-dimethoxy-5-chloroanilide, acetoacetic acid 2,5-dimethoxy-4-chloroanilide, acetoacetic acid 4-chloro-5-methylanilide, acetoacetic acid 2-methoxyanilide, acetoacetic acid 3-methoxyanilide, acetoacetic acid 4-methoxyanilide, acetoacetic acid 2,4-dimethoxyanilide, acetoacetic acid 2,5-dimethoxyanilide, acetoacetic acid 2-ethoxyanilide, acetoacetic acid 3-ethoxyanilide, acetoacetic acid 4-ethoxyanilide, acetoacetic acid 2-hydroxyanilide, acetoacetic acid 3-hydroxyanilide, acetoacetic acid 4-hydroxyanilide, acetoacetic acid 2-hydroxy-5-chloroanilide, acetoacetic acid 3-acetylaminoanilide, acetoacetic acid 4-acetylaminoanilide, acetoacetic acid 2-sulphoanilide, acetoacetic acid 3-sulphoanilide, acetoacetic acid 4-sulphoanilide, acetoacetic acid 2-methoxy-4-sulphoanilide, acetoacetic acid 2-methoxy-3-sulphoanilide, acetoacetic acid 2-sulpho-4-chloro-5-methylanilide, acetoacetic acid 2-methyl-3-chloro-5-sulphoanilide, acetoacetic acid 2-sulpho-4,5-dimethylanilide, acetoacetic acid 2-methoxy-4-sulpho-5-methylanilide, acetoacetic acid 2,4-disulphoanilide, acetoacetic acid 2,5-disulphoanilide, acetoacetic acid 2-carboxyanilide, acetoacetic acid 3-carboxylanilide, acetoacetic acid 4-carboxyanilide, acetoacetic acid 3-hydroxy-4-carboxyanilide, acetoacetic acid 3-carboxy-4-hydroxyanilide, acetoacetic acid 3,5-dicarboxyanilide, acetoacetic acid naphthyl-1-amide, acetoacetic acid naphthyl-2-amide, acetoacetic acid 2-sulphonaphthyl-1-amide, acetoacetic acid 4-sulphonapthyl-1-amide, acetoacetic acid 5-sulphonaphthyl-1-amide, acetoacetic acid 6-sulphonaphthyl-1-amide, acetoacetic acid 7-sulphonaphthyl-1-amide, acetoacetic acid 1-sulphonaphthyl-2-amide, acetoacetic acid 6-sulphonaphthyl-2-amide, acetoacetic acid 3,6-disulphonaphthyl-2-amide, acetoacetic acid 6,8-disulphonaphthyl-2-amide and acetoacetic acid 3,6,8-trisulphonaphthyl-1-amide.

Suitable coupling components $B_1$-H (VI) of the 6-hydroxy-2-pyridone series (VIb) are, for example: 4-methyl-6-hydroxy-2-pyridone, 3-cyano-6-hydroxy-2-pyridone, 4-methyl-3-cyano-6-hydroxy-2-pyridone, 4-methyl-6-hydroxy-2-pyridone-3-carboxylic acid, 4-methyl-6-hydroxy-2-pyridone-3-carboxylic acid amide, 4-methyl-6-hydroxy-2-pyridone-3-sulphonic acid, 1,4-dimethyl-6-hydroxy-2-pyridone, 1,4-dimethyl-3-cyano-6-hydroxy-2-pyridone, 1,4-dimethyl-6-hydroxy-2-pyridone-3-carboxylic acid, 1,4-dimethyl-6-hydroxy-2-pyridone-3-carboxylic acid amide, 1,4-dimethyl-6-hydroxy-2-pyridone-3-sulphonic acid, 1-ethyl-3-cyano-4-methyl-6-hydroxy-2-pyridone, 1-isopropyl-3-cyano-4-methyl-6-hydroxy-2-pyridone, 1-n-butyl-3-cyano-4-methyl-6-hydroxy-2-pyridone, 1-phenyl-4-methyl-6-hydroxy-2-pyridone-3-sulphonic acid and 1-phenyl-3-cyano-4-methyl-6-hydroxy-2-pyridone.

Suitable coupling components of the formula $B_2$-H (VIII) which can be used for the manufacture of the water-soluble disazo dyestuffs according to the invention are, for example: phenol, 2-methylphenol, 3-methylphenol, 4-methylphenol, 3-methoxyphenol, 2-hydroxybenzenesulphonic acid, 3-hydroxybenzenesulphonic acid, 4-hydroxybenzenesulphonic acid, 2-chlorophenol, 3-chlorophenol, 1,3-dihydroxybenzene, 1,3-dihydroxy-2-chlorobenzene, 1,3-dihydroxy-4-chlorobenzene, 1,3-dihydroxy-5-methylbenzene, 1,3-dihydroxy-4-hexylbenzene, 1,3-dihydroxybenzene-5-sulphonic acid, 1-amino-3-hydroxybenzene, 1-amino-3-hydroxy-4-chlorobenzene, 1-(2'-methylphenylamino)-3-hydroxybenzene, 1-(phenylamino)-3-hydroxybenzene, 3-aminophenyl-4-sulphonic acid, 3-aminophenol-6-sulphonic acid, 3-carboxymethylamino-phenyl, 1,3-diaminobenzene, 1,3-diamino-4-methylbenzene, 1,3-diamino-4-ethylbenzene, 1,3-diamino-4-n-propylbenzene, 1,3-diamino-4-n-butylbenzene, 1,3-diamino-4-chlorobenzene, 1,3-diamino-4-bromobenzene, 1,3-diamino-4-methoxybenzene, 1,3-diamino-4-ethoxybenzene, 1,3-diamino-4-n-propoxybenzene, 1,3-diamino-4-isopropoxybenzene, 1,3-diamino-4-nitrobenzene, 1-amino-3-dimethylaminobenzene, 1-amino-3-diethylaminobenzene, 1-acetylamino-3-diethylaminobenzene, 1-amino-3-carboxymethylaminobenzene, 1-amino-3-carboxymethylamino-6-methylbenzene, 1-amino-3-oxalylaminobenzene, 2-amino-4-oxalylaminotoluene, 1-amino-3-carboxyethylaminobenzene, 1-amino-3-sulphomethylaminobenzene, 1-amino-3-hydroxyethylaminobenzene, 1-amino-3-hydroxyethylamino-6-methylbenzene, 1-amino-3-sulphoethylaminobenzene, 1,3-diaminobenzene-4-sulphonic acid, 1-acetylamino-3-aminobenzene-4-sulphonic acid, 1,3-diaminobenzene-4,6-disulphonic acid, 2,4-diaminotoluene-5-sulphonic acid, 2,6-diaminotoluene-4-sulphonic acid, 1,3-bis-carboxymethylaminobenzene, 2,4-bis-carboxymethylamino-toluene, 2-hydroxybenzoic acid, 5-chloro-2-hydroxybenzoic acid, 2-hydroxy-3-methylbenzoic acid, 2-hydroxy-4-methyl-benzoic acid, 2-hydroxy-5-methylbenzoic acid, 2-hydroxy-5-sulpho-benzoic acid, 2-hydroxybenzoic acid ethyl ester, 1-hydroxynaphthalene, 1,6-dihydroxynaphthalene, 1-hydroxynaphthalene-3-sulphonic acid, 1-hydroxynaphthalene-4-sulphonic acid, 1-hydroxynaphthalene-3,6-disulphonic acid, 1-hydroxynaphthalene-5-, -6- and -7-sulphonic acid, 2-hydroxynaphthalene, 2-hydroxynaphthalene-3-carboxylic acid, 2-hydroxynaphthalene-3-carboxylic acid anilide, 2-hydroxynaphthalene-6-, -7- and -8-sulphonic acid, 2-hydroxynaphthalene-3,6-disulphonic acid, 2-hydroxynaphthalene-6,8-disulphonic acid, 1-aminonaphthalene, 1-aminonaphthalene-4-, -5-, -6- and -7-sulphonic acid, 1-carboxymethylaminonaphthalene-6-sulphonic acid, 1-carboxymethylaminonaphthalene-7-sulphonic acid, 1-aminonaphthalene-3,6-disulphonic acid, 1-aminonaphthalene-5,7-disulphonic acid, 1-aminonaphthalene-3,7-disulphonic acid, 2-aminonaphthalene-5-, -6-, -7- and -8-sulphonic acid, 2-aminonaphthalene-3,6-disulphonic acid, 2-aminonaphthalene-4,8-disulphonic acid, 2-aminonaphthalene-6,8-disulphonic acid, 2-aminonaphthalene-5,7-disulphonic acid, 1,8-dihydroxynaphthalene-3,6-disulphonic acid, 1-phenylaminonaphthalene-8-sulphonic acid, acetoacetic acid anilide, acetoacetic acid 2-methylanilide, acetoacetic acid 3-methylanilide, acetoacetic acid 4-methylanilide, acetoacetic acid 2-ethylanilide, acetoacetic acid 3-ethylanilide, acetoacetic acid 4-ethylanilide, acetoacetic acid 2,4-dimethylanilide, acetoacetic acid 2,5-dimethylanilide, acetoacetic acid 2-chloroanilide, acetoacetic acid 3-chloroanilide, acetoacetic acid 4-chloroanilide, acetoacetic acid 2-methyl-3-chloroanilide, acetoacetic acid 2-methyl-4-chloroanilide, acetoacetic acid 2,4-dimethoxy-5-chloroanilide, acetoacetic acid 2,5-dimethoxy-4-chloroanilide, acetoacetic acid 4-chloro-5-methylanilide, acetoacetic acid 2-methoxyanilide, acetoacetic acid 3-methoxyanilide, acetoacetic acid 4-methoxyanilide, acetoacetic acid 2,4-dimethoxyanilide, acetoacetic acid 2,5-dimethoxyanilide, acetoacetic acid 2-ethoxyanilide, acetoacetic acid 3-ethoxyanilide, acetoacetic acid 4-ethoxyanilide, acetoacetic acid 2-hydroxyanilide, acetoactic acid 3-hydroxyanilide, acetoacetic acid 4-hydroxyanilide, acetoacetic acid 2-hydroxy-5-chloroanilide, acetoacetic acid 3-acetylaminoanilide, acetoacetic acid 4-acetylaminoanilide, acetoacetic acid 2-sulphoanilide, acetoacetic acid 3-sulphoanilide, acetoacetic acid 4-sulphoanilide, acetoacetic acid 2-methoxy-4-sulphoanilide, acetoacetic acid 2-methoxy-5-sulphoanilide, acetoacetic acid 2-sulpho-4-chloro-5-methylanilide, acetoacetic 2-methyl-3-chloro-5-sulphoanilide, acetoacetic acid 2-sulpho-4,6-dimethylanilide, acetoacetic acid 2-methoxy-4-sulpho-5-methylanilide, acetoacetic acid 2,4-disulphoanilide, acetoacetic acid 2,5-disulphoanilide, acetoacetic 2-carboxyanilide, acetoacetic acid 3-carboxyanilide, acetoacetic acid 4-carboxyanilide, acetoacetic acid 3-hydroxy-4-carboxyanilide, acetoacetic acid 3-carboxy-4-hydroxyanilide, acetoacetic acid 3,5-dicarboxyanilide, acetoacetic acid naphthyl-1-amide, acetoacetic acid naphthyl-2-amide, acetoacetic acid 2-sulphonaphthyl-1-amide, acetoacetic acid 4-sulphonaphthyl-1-amide, acetoacetic acid 5-sulphonaphthyl-1-amide, acetoacetic acid 6-sulphonaphthyl-1-amide, acetoacetic acid 7-sulphonaphthyl-1-amide, acetoacetic acid 1-sulphonaphthyl-2-amide, acetoacetic acid 6-sulphonaphthyl-2-amide, acetoacetic acid 3,6-disulphonaphthyl-2-amide, acetoacetic acid 6,8-disulphonaphthyl-2-amide, acetoacetic acid 3,6,8-trisulphonaphthyl-1-amide, 3-methyl-5-pyrazolone, 1-phenyl-3-methyl-5-pyrazolone, 1-(4′-methylphenyl)-3-methyl-5-pyrazolone, 1-(2′-ethylphenyl)-3-methyl-5-pyrazolone, 1-(2′-chlorophenyl)-3-methyl-5-pyrazolone, 1-(4′-chlorophenyl)-3-methyl-5-pyrazolone, 1-(2′-methyl-6′-chlorophenyl)-3-methyl-5-pyrazolone, 1-(2′,5′-dichlorophenyl)-3-methyl-5-pyrazolone, 1-(2′-chloro-4′-sulphophenyl)-3-methyl-5-pyrazolone, 1-(2′-chloro-5′-sulphophenyl)-3-methyl-5-pyrazolone, 1-(3′-cyanophenyl)-3-methyl-5-pyrazolone, 1-(2′-nitrophenyl)-3-methyl-5-pyrazolone, 1-(3′-nitrophenyl)-3-methyl-5-pyrazolone, 1-(4′-nitrophenyl)-3-methyl-5-pyrazolone, 1-(2′-sulphophenyl)-3-methyl-5-pyrazolone, 1-(3′-sulphophenyl)-3-methyl-5-pyrazolone, 1-(4′-sulphophenyl)-3-methyl-5-pyrazolone, 1-(2′-nitro-4′-sulphophenyl)-3-methyl-5-pyrazolone, 1-(4′-nitro-2′-sulphophenyl)-3-methyl-5-pyrazolone, 1-(2′,5′-dichloro-4′-sulphophenyl)-3-methyl-5-pyrazolone, 1-(2′-methyl-6′-chloro-4′-sulphophenyl)-3-methyl-5-pyrazolone, 1-(2′-carboxyphenyl)-3-methyl-5-pyrazolone, 1-(3′-carboxyphenyl)-3-methyl-5-pyrazolone, 1-(4′-carboxyphenyl)-3-methyl-5-pyrazolone, 1-(2′-hydroxy-3′-carboxy-5′-sulphophenyl)-3-methyl-5-pyrazolone, 1-(2′,5′-disulphophenyl)-3-methyl-5-pyrazolone, 1-(2′,4′-disulphophenyl)-3-methyl-5-pyrazolone, 1-(2′-aminophenyl)-3-methyl-5-pyrazolone, 1-(3′-aminophenyl)-3-methyl-5-pyrazolone, 1-(4′-aminophenyl)-3-methyl-5-pyrazolone, 1-phenyl-5-pyrazolone-3-carboxylic acid methyl ester, 1-phenyl-5-pyrazolone-3-carboxylic acid ethyl ester, 1-(4′-sulphophenyl)-5-pyrazolone-3-carboxylic acid ethyl ester, 1-(4′-chlorophenyl)-5-pyrazolone-3-carboxylic acid ethyl ester, 1-(2′-chloro-4′-sulpho-6′-methylphenyl)-5-pyrazolone-3-carboxylic acid ethyl ester, 1-phenyl-5-pyrazolone-3-carboxylic acid, 1-(2′-carboxyphenyl)-5-pyrazolone-3-carboxylic acid, 1-(2′-sulphophenyl)-5-pyrazolone-3-carboxylic acid, 1-(3′-sulphophenyl)-5-pyrazolone-3-carboxylic acid, 1-(4′-sulphophenyl)-5-pyrazolone-3-carboxylic acid, 1-(3′-nitrophenyl)-5-pyrazolone-3-carboxylic acid, 1-(4′-nitrophenyl)-5-pyrazolone-3-carboxylic acid, 1-(2′,5′-dichloro-4′-sulphophenyl)-5-pyrazolone-3-carboxylic acid, 1-(3′-aminophenyl)-5-pyrazolone-3-carboxylic acid, 1-(4′-aminophenyl)-5-pyrazolone-3-carboxylic acid, 1-(3′-amino-6′-methyl-5′-sulphophenyl)-5-pyrazolone-3-carboxylic acid, 1-(2′-sulpho-4′-ethoxyphenyl)-5-pyrazolone-3-carboxylic acid, 1-phenyl-5-pyrazolone-3-carboxylic acid amide, 1-(4′-chlorophenyl)-5-pyrazolone-3-carboxylic acid amide, 1-(4′-sulphophenyl)-5-pyrazolone-3-carboxylic acid amide, 1-phenyl-3-acetyl-5-pyrazolone, 1-(4′-chlorophenyl)-3-acetyl-5-pyrazolone, 1-(4′-methylphenyl)-3-acetyl-5-pyrazolone, 1-(4′-sulphonaphthyl-1′)-3-methyl-5-pyrazolone, 1-(6′-sulphonaphthyl-2′)-3-methyl-5-pyrazolone, 1-(5′,7′-disulphonaphthyl-2′)-3-methyl-5-pyrazolone, 1-(4′,8′-disulphonaphthyl-2′)-3-methyl-5-pyrazolone, 4-methyl-6-hydroxy-2-pyridone, 3-cyano-6-hydroxy-2-pyridone, 4-methyl-3-cyano-6-hydroxy-2-pyridone, 4-methyl-6-hydroxy-2-pyridone-3-carboxylic acid, 4-methyl-6-hydroxy-2-pyridone-3-carboxylic acid amide, 4-methyl-6-hydroxy-2-pyridone-3-sulphonic acid, 1,4-dimethyl-6-hydroxy-2-pyridone, 1,4-dimethyl-3-cyano-6-hydroxy- 2-pyridone, 1,4-dimethyl-6-hydroxy-2-pyridone-3-carboxylic acid, 1,4-dimethyl-6-hydroxy-2-pyridone-3-carboxylic acid amide, 1,4-dimethyl-6-hydroxy-2-pyridone-3-sulphonic acid, 1-ethyl-3-cyano-6-hydroxy-2-pyridone, 1-isopropyl-3-cyano-6-hydroxy-2-pyridone, 1-n-butyl-3-cyano-6-hydroxy-2-pyridone, 2,6-diamino-3-cyano-4-methylpyridine, 1-phenyl-4-methyl-6-hydroxy-2-pyridone-3-sulphonic acid and 1-phenyl-3-cyano-4-methyl-6-hydroxy-2-pyridone.

The disazo dyestuffs according to the invention are outstandingly suitable for use as direct dyestuffs for dyeing and printing natural or synthetic fibre materials which contain hydroxyl groups or which contain nitrogen, in particular cotton and regenerated cellulose and also wool, wool/cotton union, silk, polyamide, leather and paper. Dyeing and printing is carried out by customary processes.

Yellow, orange, red and brown dyeings of good depth of colour are obtained on the substrates mentioned.

The dyeings are distinguished by good fastness properties, in particular good fastness to wet processing, for example fastness to water, and washing at 40° C. and washing at 60° C., as well as good fastness to perspiration (alkaline+acid), fastness to acid and fastness to alkali, fastness to formaldehyde and fastness to ironing.

If

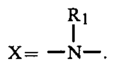

in particular if

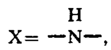

the dyestuffs according to the invention are taken up to a considerable extent by the fibres during dyeing by the exhaustion process, so that almost clear non-polluting residual liquors are obtained.

Mixtures of the individual dyestuffs listed in Tables Ia and Ib, which can be obtained either by mixing the individual dyestuffs or by mixed coupling during the manufacture of the dyestuffs, are also to be understood as disazo dyestuffs according to the invention. In the manufacture of mixtures of individual dyestuffs by mixed coupling, mixtures of coupling components of the formula $B_1$-H (VIa, VIb) and/or $B_2$-H (VIII) are employed.

The mixtures of the individual dyestuffs, obtained by mixing the individual dyestuffs or by mixed coupling, are also distinguished by a high tinctorial strength as well as by the aforementioned good fastness properties.

The new dyestuffs are suitable, above all, for dyeing and printing fibres of cotton and regenerated cellulose, as well as polyamide, leather and paper.

In the Examples which follow, parts denote parts by weight, percentages denote percentages by weight and the temperatures are given in degrees Centigrade.

EXAMPLE 1

(a) 22.4 parts of 2-(4'-aminophenyl)-5 (or-6)-aminobenzimidazole are tetrazotized in a mixture of 200 parts of water and 50 parts of 30% strength aqueous hydrochloric acid at 0°-5° with a solution of 13.8 parts of sodium nitrite in 50 parts of water. The mixture is then stirred for 1 hour at 0°-5° and excess nitrous acid is removed with amidosulphonic acid. A solution of 15.6 parts of 2-hydroxybenzoic acid and 40 parts of sodium carbonate in 150 parts of water is added to the solution of the tetrazo component in the course of about 15 minutes. The one-sided coupling has ended after subsequently stirring for 2-3 hours at pH 9-10 and at 0°-5° C. A solution of 18.6 parts of acetoacetic acid anilide in 200 parts of water and 14.6 parts of 30% strength sodium hydroxide solution is added rapidly to the suspension of the diazotised monoazo dyestuff and the coupling mixture is stirred for 3 hours at pH 8-10.

The dyestuff of the structure

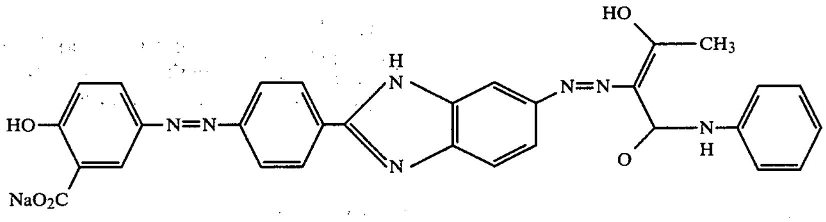

which separates out at pH 5 is then filtered off and dried at 70°-80° C.

(b) A solution of 0.2 part of sodium carbonate and 4 parts of Glauber's salt in 200 parts of water is prepared at 40° C. in a dyeing beaker, which is in a heatable bath. 0.2 part of the dyestuff prepared according to Example 1 is then added. 10 g of woven cotton fabric are kept continuously moving in the prepared dye liquor, the temperature is increased to 95° C. and dyeing is carried out for a further 45 minutes at this temperature. The dyed woven cotton fabric is thereafter removed from the residual liquor, which now only remains weakly coloured, and the liquor still adhering is removed by wringing out. The dyed material is then rinsed with cold water and dried at 60° C.

A greenish-tinged yellow dyeing of good depth of colour and with good technological properties, in particular with good fastnesses to wet processing and washing, very good fastness to perspiration (alkaline and acid), good fastness to acid and alkali and good fastness to formaldehyde is obtained.

EXAMPLE 2

22.4 parts of 2-(4'-aminophenyl)-5 (or-6)-aminobenzimidazole are tetrazotised according to the instructions in Example 1. A solution of 21.6 parts of 4-methyl-6-hydroxy-2-pyridone-3-sulphonic acid in 150 parts of water and 13.3 parts of 30% strength sodium hydroxide solution is added to the yellow-brown tetrazo solution in the course of about 30 minutes and the pH value is then adjusted to 4.5 by sprinkling in 27 parts of sodium acetate.

In order to bring the one-sided coupling reaction to completion, the mixture is subsequently stirred for 2 hours at 0°–5° C. and pH 4.5 and a solution of 23.8 parts of 1-(4′-sulphophenyl)-3-methyl-5-pyrazolone in 150 parts of water and 14.6 parts of 30% strength sodium hydroxide solution is added rapidly to the diazotised monoazo dyestuff.

The pH value of the coupling mixture is then adjusted to 8.5–9 with a solution of 45 parts of sodium carbonate in 250 parts of water and the mixture is subsequently stirred for 3 hours.

The pH is adjusted to 7.5 with 30% strength hydrochloric acid and the disazo dyestuff of the structure

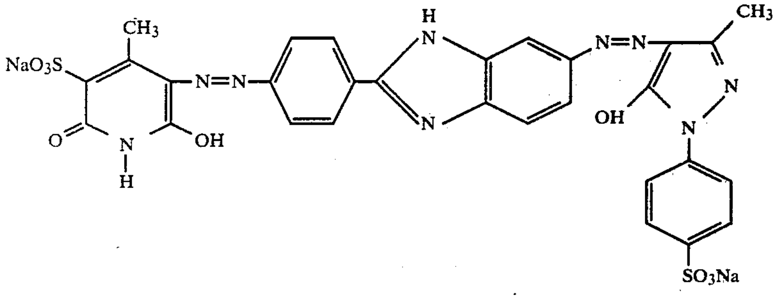

is filtered off and dried at 70°–80° C.

The dyestuff gives, on cotton, an orange-red dyeing of good depth of colour and with good fastness properties, in particular with good fastnesses to water and washing and very good fastnesses to perspiration (alkaline and acid).

EXAMPLE 3

22.4 parts of 2-(4′-aminophenyl)-5 (or-6)-aminobenzimidazole are tetrazotised according to the instructions in Example 1.

The yellow-brown tetrazo solution in then run, at 0°–5° C., into a solution of 51.4 parts of acetoacetic acid 3-sulphoanilide, 8 parts of sodium hydroxide and 50 parts of sodium carbonate in 300 parts of water. In order to bring the coupling reaction to completion, the mixture is subsequently stirred for 2 hours at pH 8.5–9 and at 0°–5° C. The dyestuff of the structure

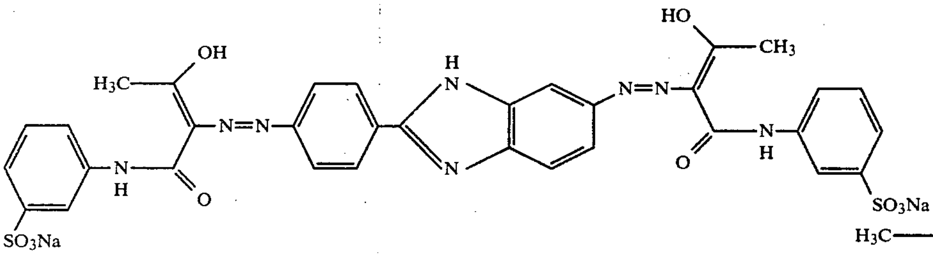

which separates out at pH 7.5 is filtered off and dried.

The disazo dyestuff dyes cotton with yellow colour shades. The dyeings have a good depth of colour and good fastness properties, in particular good fastnesses to water, washing and perspiration.

What we claim is:

1. Disazo compound of the formula $B_1$-N=N-Z-N=N-$B_2$ wherein Z is

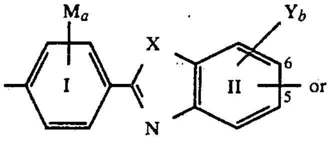

or

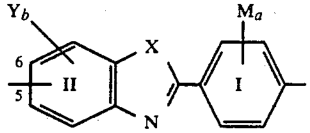

wherein Y and M are the same or different and are methyl, ethyl, methoxy, ethoxy and halogen, a and b are 0, 1 or 2, X is

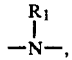

—O— or —S—, $R_1$ is hydrogen, alkyl having one to 4 carbon atoms, phenyl or benzyl, $B_1$ is a CH-acid coupling component of the acetoacetic acid arylamide series of the formula

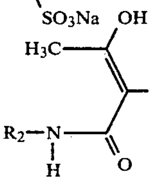

wherein $R_2$ is

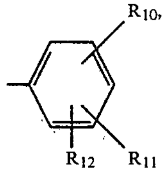

naphthyl-1, naphthyl-2,

-continued

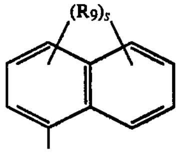

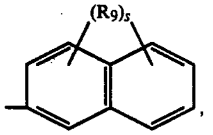, benzimidazolon-5-yl, halogen substituted benzimidazolon-5-yl or alkyl-substituted benzimidazolon-5-yl having 1 to 2 carbon atoms in the alkyl moiety, wherein $R_{10}$, $R_{11}$ and $R_{12}$ is independently from each other hydrogen, sulpho, carboxyl, nitro, amino, cyano, halogen, alkyl having 1 to 4 carbon atoms, hydroxyl, alkoxy having 1 to 4 carbon atoms or alkanoylamino having 1 to 4 carbon atoms in the alkanoyl moiety, $R_9$ is sulpho, and s is 1, 2 or 3, and $B_2$ is another coupling component radical which may be the same as $B_1$ or different with the proviso that said disazo compound contains at least one sulpho group or carboxyl group in the dyestuff molecule and the alkali metal salt, alkaline earth metal salt or ammonium salt thereof.

2. Disazo compound as claimed in claim 1 wherein $B_2$ is the radical of a coupling component of the benzene, naphthalene, or acetoacetic acid arylamide, series.

3. Disazo compound as claimed in claim 1 wherein $B_2$ is aminophenyl, aminohydroxyphenyl, diaminophenyl, dihydroxyphenyl, aminophenyl and diaminophenyl the amino groups of which are monosubstituted or disubstituted with alkyl radicals with 1–4 C atoms or carboxyalkyl, sulphoalkyl or hydroxyalkyl radicals with 1–2 C atoms, or monosubstituted by phenyl, o-tolyl, oxylyl, alkylcarbonyl with 1–4 C atoms or benzoyl.

4. Disazo compound as claimed in claim 1 wherein the radical $B_2$ is derived from a coupling component of the 1-aminonaphthalene, 2-aminonaphthalene, 1-hydroxynaphthalene or 2-hydroxynaphthalene series.

5. Disazo compound as claimed in claim 4 wherein said 1-aminonaphthalene, 2-aminonaphthalene, 1-hydroxynaphthalene and 2-hydroxynaphthalene have a carboxyl substituent or 1–3 sulpho substituents.

6. Disazo compound as claimed in claim 4 wherein said 1-aminonaphthalene and 2-aminonaphthalene are amino monosubstituted by alkanoyl having 1 to 4 carbon atoms in the alkanoyl moiety, benzoyl, phenyl, tolyl, alkyl having 1 to 4 carbon atoms or carboxyalkyl, hydroxyalkyl or sulphoalkyl, each having 1 or 2 carbon atoms.

7. Disazo compound as claimed in claim 1 wherein $B_2$ is the radical of a coupling component of the acetoacetic acid arylamide series of the formula

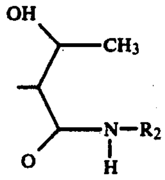

wherein $R_2$ has the same meaning as defined in claim 1.

8. Disazo compound as claimed in claim 1 wherein X represents

and wherein $R_1$ has the same meaning as defined in claim 1.

9. Disazo compounds as claimed in claim 1 wherein X is

.

10. Disazo compounds as claimed in claim 1 wherein Y and M on the Z nuclei are the same or different and have the same meaning as in claim 1 with the proviso that either a or b must be 1 or 2.

11. Disazo compounds as claimed in claim 8, wherein Y and M are the same or different and are methyl or chlorine and a and b are the same or different and are 0 or 1.

12. Disazo compound as claimed in claim 1 wherein $B_2$ is phenyl having at least one substituent selected from the group consisting of alkyl having 1 to 6 carbon atoms, alkoxy having 1 to 4 carbon atoms, benzenesulphonyloxy, p-toluenesulphonyloxy, hydroxy, cyano, nitro, sulpho, carboxyl, halogen, alkoxycarbonyl with 1 to 4 carbon atoms, amino, hydroxy, and substituted amino; said substituted amino being monosubstituted by a member selected from the group consisting of phenyl, tolyl, benzoyl, oxalyl, and alkylcarbonyl having 1 to 4 carbon atoms or said substituted amino being monosubstituted or disubstituted by alkyl having 1 to 4 carbon atoms, alkoxy having 1 to 4 carbon atoms, carboxyalkyl, sulphoalkyl or hydroxyalkyl wherein the alkyl moiety has 1 or 2 carbon atoms.

* * * * *

UNITED STATES PATENT OFFICE

CERTIFICATE OF CORRECTION

Patent No. 4,225,492 Dated September 30, 1980

Inventor(s) Wolfgang Bauer et al

It is certified that error appears in the above-identified patent and that said Letters Patent are hereby corrected as shown below:

| Column | Line | Correction |
| --- | --- | --- |
| 2 | 10 | Structure of formula should read as follows: |

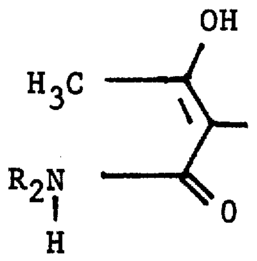

(II)

UNITED STATES PATENT OFFICE

CERTIFICATE OF CORRECTION

Patent No. 4,225,492 Dated September 30, 1980

Inventor(s) Wolfgang Bauer et al

It is certified that error appears in the above-identified patent and that said Letters Patent are hereby corrected as shown below:

| Column | Line | Correction |
|---|---|---|
| 14 | 25 | Structure of formula should read as follows: |

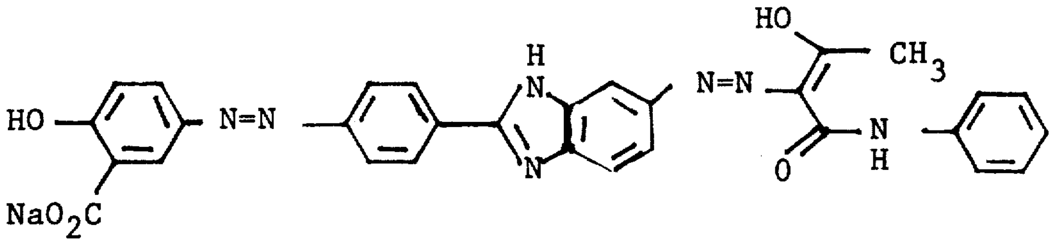

UNITED STATES PATENT OFFICE

CERTIFICATE OF CORRECTION

Patent No. 4,225,492 Dated September 30, 1980

Inventor(s) Wolfgang Bauer et al

It is certified that error appears in the above-identified patent and that said Letters Patent are hereby corrected as shown below:

| Column | Line | Correction |
|---|---|---|
| 18 | 5 | Structure of formula should read as follows: |

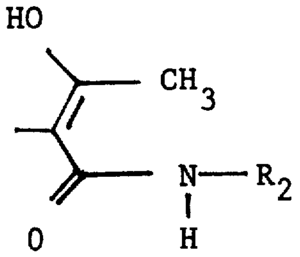

Signed and Sealed this

*Second* Day of *March 1982*

[SEAL]

*Attest:*

GERALD J. MOSSINGHOFF

*Attesting Officer* *Commissioner of Patents and Trademarks*